(12) United States Patent  (10) Patent No.: US 8,159,679 B2
Gardiner et al.  (45) Date of Patent: Apr. 17, 2012

(54) APPARATUS FOR MEASURING CARRIAGEWAY SURFACE PROPERTIES

(75) Inventors: John Leslie Gardiner, Bristol (GB); Ian Clifford Willis, Tetbury (GB)

(73) Assignee: W.D.M. Limited, Bristol (GB)

( * ) Notice: Subject to any disclaimer, the term of this patent is extended or adjusted under 35 U.S.C. 154(b) by 78 days.

(21) Appl. No.: 12/484,610

(22) Filed: Jun. 15, 2009

(65) Prior Publication Data

US 2009/0310143 A1    Dec. 17, 2009

(30) Foreign Application Priority Data

Jun. 17, 2008  (GB) .................................. 0811080.1

(51) Int. Cl.
*G01N 21/00* (2006.01)

(52) U.S. Cl. ........................................................ 356/600

(58) Field of Classification Search ........... 356/600–615
See application file for complete search history.

(56) References Cited

U.S. PATENT DOCUMENTS

| 4,796,998 A | 1/1989 | Soma et al. |
| 4,958,306 A | 9/1990 | Powell et al. |
| 5,790,243 A * | 8/1998 | Herr ................................ 356/5.1 |
| 2002/0176608 A1 * | 11/2002 | Rose ............................... 382/108 |
| 2006/0274930 A1 | 12/2006 | Laurent et al. |
| 2008/0228436 A1 | 9/2008 | Farritor |

FOREIGN PATENT DOCUMENTS

| EP | 0215948 A1 | 4/1987 |
| JP | 60210706 A | 10/1985 |
| JP | 3084404 A | 4/1991 |
| JP | 4032705 A | 2/1992 |
| JP | 9101129 A | 4/1997 |
| JP | 9210682 A | 8/1997 |
| JP | 09287932 A | 11/1997 |
| JP | 10288516 A | 10/1998 |
| WO | WO 03/106924 A1 | 12/2003 |

OTHER PUBLICATIONS

Great Britain Search Report from application No. GB0811080.1 dated Jun. 22, 2009.
Search Report dated Oct. 8, 2009 from European Patent Application No. EP 09162334.

* cited by examiner

*Primary Examiner* — Michael P Stafira

(74) *Attorney, Agent, or Firm* — Wolf, Greenfield & Sacks, P.C.

(57) ABSTRACT

An apparatus for measuring surface properties of a carriageway or road, comprising a platform arranged to move over the carriageway, the platform carrying a light source arranged to illuminate the carriageway, and a detector arranged to receive light returning from the carriageway, characterized in that the light source projects a line of light onto the surface and data representing light returning from the line of light is captured and stored.

12 Claims, 5 Drawing Sheets

APPARATUS FOR MEASURING CARRIAGEWAY SURFACE PROPERTIES

FIELD OF THE INVENTION

The present invention relates to an apparatus for measuring properties of a carriageway.

BACKGROUND OF THE INVENTION

It is desirable to be able to quantify parameters of a road surface. Users of roads generally desire that the road is "smooth" and that it offers sufficient friction for them to be able to accelerate and brake safely. Furthermore the road surface has to offer sufficient friction to a vehicle tire when the road is wet.

In order to measure "smoothness" it is known to use vehicles travelling at relatively high speed such that the vehicle body and its suspension carry a form of inertial platform. The vehicle body directs a pulse of light from a laser towards the road surface and views the diffuse scatter from the surface with an optical detector which has a direction of view inclined with respect to the direction of the beam of laser light. This allows a direct measurement of the distance from the light source to the road surface to be measured. The vehicle body also carries an accelerometer aligned with direction of the projection of the laser and travels sufficiently fast such that vertical movements of the vehicle body can also be measured. When the displacement derived from the accelerometer is subtracted from the laser displacement, the displacement created by the road smoothness remains. This technique can only be successfully employed when the survey vehicle can travel sufficiently fast to allow the accelerometer to accurately measure vehicle body height variations. This technique cannot be used over short distances such as transverse or oblique to the direction of a carriageway.

Roads also need a rough or "textured" surface to allow water to be dispersed away from the contact area between the road and a tire. Failure to provide a textured surface prevents water from being dispersed and can lead to "aquaplaning" where the tire rides on a film of water above the road surface and loses friction contact with the road.

The surface texture can also be measured by directing a pulse of light onto the road surface and viewing diffuse scatter from the road surface at an oblique angle such that the distance between the road surface and the light source is translated directly into position on a photo-detector array. The difference between smoothness and texture is purely one of wavelength. Thus the "inertial platform" described hereinabove can also capture surface texture.

SUMMARY OF THE INVENTION

According to a first aspect of the present invention there is provided an apparatus for measuring surface properties of a carriageway or road, the apparatus comprising a platform arranged to move over the carriageway, the platform carrying a light source arranged to illuminate the carriageway, and a detector arranged to receive light returning from the carriageway, characterised in that the light source projects a line of light onto the surface of the carriageway and data representing light returning from the carriageway is captured and stored.

Thus the present invention projects a line of light onto the carriageway surface, unlike prior art systems which only project a single spot onto a surface. Projecting a line of light has significant advantages. If the line of light is substantially parallel to a direction of travel of the platform then a plurality of measurements representing the road surface can be taken, and adjacent measurements can be compared with one another in order to align the measurements such that a series of discreet measurements can be formed into a single elongate measurement. The comparison is preferably performed by cross correlation between adjacent sets of measurements. The integrity of measurements can also be improved as the same portion of road surface may be scanned multiple times by virtue of being included in one or more adjacent measurements. Data from the same section of the road surface may then be averaged to improve the signal to noise ratio therein.

Furthermore, where the same section of road has been captured several times in measurements, but where the displacement is not a multiple of the pixel separation in a detector, then image processing may be used to merge data from dissimilar measurements in order to synthesis a higher resolution data set than actually used for the image capture.

Advantageously the apparatus provides an indication of surface texture.

The apparatus may further include a data processor arranged to form short term estimates of the gradient of the carriageway with respect to a preceding portion of the carriageway. These estimates of gradient may then be processed to obtain an indication of relative changes in the gradient of the carriageway over a specific distance or specific spatial periodicities. This data can then be represented to show whether the carriageway is notionally smooth or to indicate sections of the carriageway which have undesirable undulations therein. It is thus possible to construct an apparatus which can provide an estimate of gradient or height changes in a carriageway surface with respect to a datum, but which does not need to rely on the inertial platform techniques used by the prior art. Thus, because the present apparatus does not need to rely on inertial platforms it can be used at much slower speeds, for example less than ten miles an hour and advantageously at substantially walking speed.

Advantageously the line of light may be substantially at right angles to the direction of travel so as to image a swathe along the carriageway as the device is moved along the carriageway. This provides a useful measurement of the carriageway's texture along such a swathe, and this can be related to the ability of a carriageway to disperse water thereby reducing the risk of vehicles aquaplaning. Advantageously the direction of the line of light is switchable between substantially parallel with the direction of travel and substantially at right angles to the direction of travel. Alternatively, the line of light could be positioned obliquely to the direction of travel such that multiple measurements can be analysed to synthesise, optionally in a post processing activity, data sets that would be obtained if the line of light was parallel to the direction of travel and data sets that would be obtained if the line of light was at right angles to the direction of travel.

According to a second aspect of the present invention there is provided a method of measuring surface properties of a carriageway, the method comprising illuminating a section of the carriageway with a line of light from a light source such that an elongate section of the carriageway can be inspected without moving a platform carrying the light source, and receiving reflected light at a photo-detector that images the line of light so as to take multiple spaced apart measurements of carriageway surface height variations.

BRIEF DESCRIPTION OF THE FIGURES

The present invention will now be described, by way of example only, with reference to the accompanying Figures, in which.

DESCRIPTION OF PREFERRED EMBODIMENTS

Figure 1:
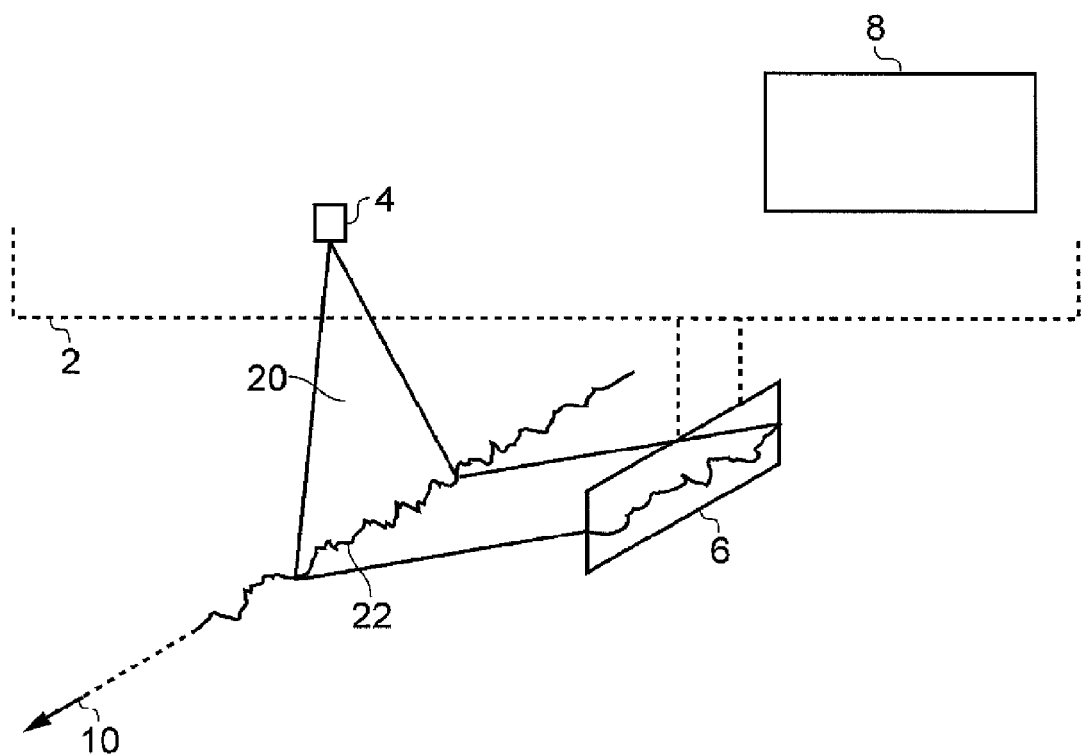
FIG. 1 schematically represents an optical imaging and data capture system imaging a carriageway and constituting a first embodiment of the present invention.

FIG. 1 schematically illustrates the optical and data processing system of an apparatus for measuring surface properties of a carriageway and constituting an embodiment of the present invention. A movable platform, schematically designated by the chain line 2 carries a light source 4, a photo-detector array 6 and a data capture unit 8 above a surface 10 of a carriageway under inspection. Any portion of a carriageway can be characterised by several properties. The present invention is designed to facilitate measurements of small scale height variations in the carriageway, which constitute surface texture, together with estimates of relative gradients of the small portions of the carriageway with respect to the gradient of a preceding portion. These estimates may then be combined, for example by integration, to obtain estimates of changes in the gradient of the carriageway over longer distances, thereby to identify undulations in the carriageway, although this data gives no absolute indication to the gradient of the carriageway at any given point. Advantageously, while stationary, with the addition of an accelerometer sensing the acceleration due to gravity, the absolute gradient of the very first portion could be determined, and hence the absolute gradient of the carriageway established if required. Subsequent measurements of gradient may be made when the device is moving, but advantageously not accelerating.

The light source 4 is preferably a laser light producing a fan 20 of light that forms a line 22 of light over a portion of the carriageway. Thus an elongate line of light illuminates the carriageway even when the platform is stationary. The device utilises a principal of structured light triangulation. In a preferred embodiment the laser points directly downwards and the fan of light is aligned in the direction of travel of the platform 2. In use light is diffusely scattered from the road surface and this scattering is observed by a photo-detector array 6 which is offset from the laser 4 and hence can be regarded as viewing the carriageway surface at an oblique angle. As a result, and as is known to the person skilled in the art, such an arrangement gives a direct measurement of the relative heights of the diffuse scatterers within the carriageway surface as vertical displacement is directly converted to a horizontal displacement within the CCD array 6. By using a line of light multiple measurements along the length of the line of light can be made in a single instance. These measurements of road surface are then conveyed from the photo-detector 6 to a data storage and optionally data processing unit 8. The storage and processing unit 8 is typically a fairly standard computing architecture comprising non-volatile memory, such as magnetic or bubble memory storage together with semi-conductor memory and a central processing unit. Additionally the data processor also includes non-volatile program memory for storing an operating system and an application for collecting and processing the data from the CCD array 6.

Figure 2:
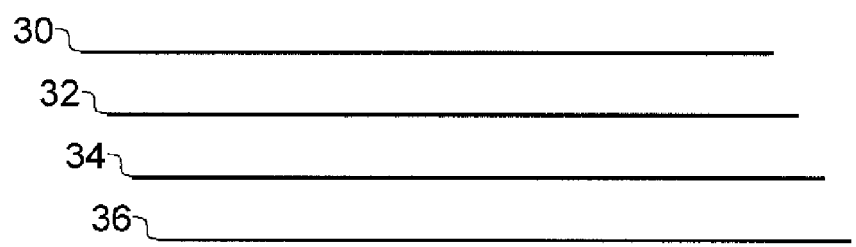
FIG. 2 schematically illustrates the relationship between adjacent data sets captured by the apparatus shown in FIG. 1.

In a preferred embodiment of the present invention the line of light is greater than 10 cm long at the road surface and, in use, data captures are repeated frequently such that even though the carriage is continually moving, a second data capture includes greater than 90% of the road surface imaged in a preceding first data capture. This is schematically illustrated in FIG. 2 where length of road surface is illuminated and data therefrom is captured in a first data capture 30. A second data capture 32 along a path parallel to and in line with the first data capture 30 (but shown spaced apart in FIG. 2 for clarity) is then performed and it can be seen that the majority of the second data capture 32 overlies the same segment of road as was imaged in the first data capture 30. A subsequent third data capture 34 again images substantially the same portion of road as the second data capture 32. A fourth data capture 36 images substantially the same portion of road as the third data capture 34, and indeed the preceding data captures 32 and 30. Thus, the degree of spatial correlation between adjacent portions of the road being imaged may be in the high 90% and typically around 98%.

Figure 3A:
FIG. 3a to 3c schematically compare three measurements of surface texture to show how adjacent overlapping measurements can be cross-correlated.

FIG. 3a schematically represents the measurement of local road surface height at a macro scale, representing surface texture, as captured in the first data capture 30. The data could be regarded as being bounded by start and finish lines 40 and 42, respectively. In the next data capture substantially the same segment of road is observed, but the carriage has moved such that the boundary of the data is now defined by lines 44 and 46. It can be seen from inspection of the Figure that the majority of the data between lines 42 and 44 of FIG. 3b was also contained in FIG. 3a. However a segment between line 40 and line 44 has now been lost and a new segment between line 42 and line 46 has been included.

Figure 3B:
Figure 3C:
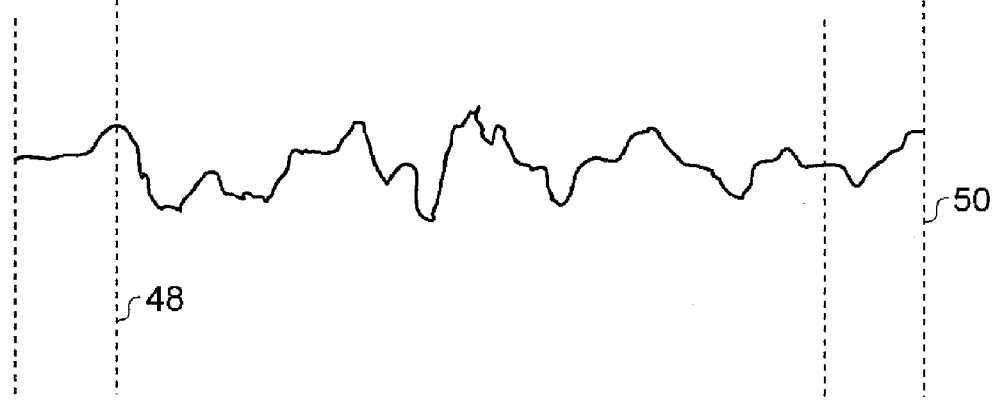

The data processor analysing this data has no apriori knowledge about the speed of movement of the platform, or indeed whether its speed was constant. It therefore has no external information in order to help it to align one data measurement with the next such that the individual measurements can be synthesised into a continuous run. However because of the high degree of overlap between one measurement and the next the data processor can cross correlate the first measurement as shown in FIG. 3a with the second measurement as shown in FIG. 3b. As is known to the person skilled in the art the cross correlation function can be expected to exhibit a maximum when the data is brought into data alignment, and hence the cross correlation function will then yield a value representing the displacement that occurred between the first measurement 30 and the second measurement 32. This displacement can then be used to allow data from one measurement to be appended to data from a preceding measurement or alternatively for a mixture of apendment of the data sets and averaging of the data sets to be performed. Similarly, for the third data measurement as shown in FIG. 3c the data is constrained to lie between start and end points 48 and 50 but again a large proportion of that data is contained in the preceding data set as shown in FIG. 3b, and indeed in the data set preceding that as shown in FIG. 3a. Thus cross correlation provides a powerful tool for analysing the amount of displacement which has occurred between adjacent, or indeed near adjacent data sets, and then to allow these sets to be merged into a single data run representative of the road surface over a relatively large distance, and a distance significantly greater than the length of the light line 22.

For the purpose of data analysis, it is most convenient if each measurement road height is performed at a predetermined distance from a preceding measurement. Consequently the measurements are assumed to be taken at regular intervals. However, in reality this will not occur because the speed of the platform is not known. However, this need not create a significant problem as the data processor 8 can calculate the position where a measurement was taken, and then assign it to its nearest data collection point effectively re-sampling the measurement into a regularly spaced progression.

Figure 4:
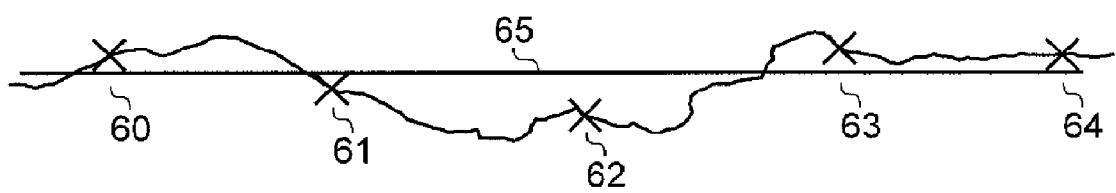
FIG. 4 schematically illustrates a short section of data where height measurements have been quantised, and how these can be fitted to a constrained linear line of best fit.

As noted before, it is desirable to be able to provide measurements showing how much a carriageway deviates from the notionally smooth ideal. Short term deviations occurring on a periodicity of 3, 10 or 30 meters may be of particular interest to engineers as a measurement of quality of the "smoothness" of the carriageway. This measurement of smoothness is irrespective of any gross changes in gradient due to the local topology. FIG. 4 schematically illustrates a small section of the synthesised road height data where measurements have been assigned to data binning points 60 to 64. The data processor 8, or a post processing processor, can then select the data points 60 to 64 and perform a straight line fitting to those points to find a short segment of a straight line 65 which has the best to least squares fit with respect to the data points 60 to 64. As part of this process the line 65 will be assigned a gradient by the fitting routine which is representative of the local gradient of the road with respect to some undefined referenced datum. However this process can be repeated for adjacent short sections of road to obtain a map of gradient changes along the road which is indicative of the smoothness of the road. Least squares fitting to a straight line segment is a well known technique and does not need to be described here.

Figure 5:
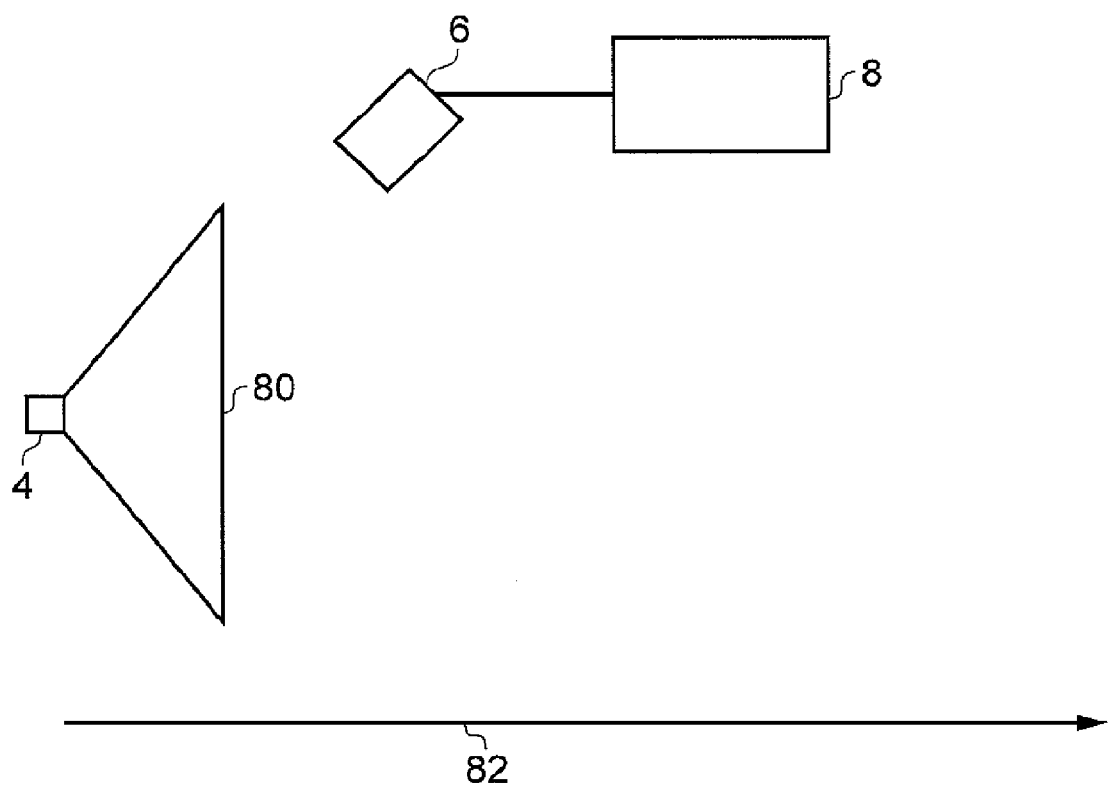
FIG. 5 shows an optical arrangement for measured texture for a swathe of surface.

FIG. 5 shows a variation to the arrangement shown in FIG. 1 where the laser 4 has been turned through 90° so as to project a line of light 80 along a direction transverse to a direction 82 of travel of the platform. Diffuse scatter from the road surface is, as before, monitored by a CCD array 6 and data therefrom is stored or processed a data processor 8. This measurement allows a surface texture over a swathe of road in the direction of travel to be rapidly estimated.

Figure 6:
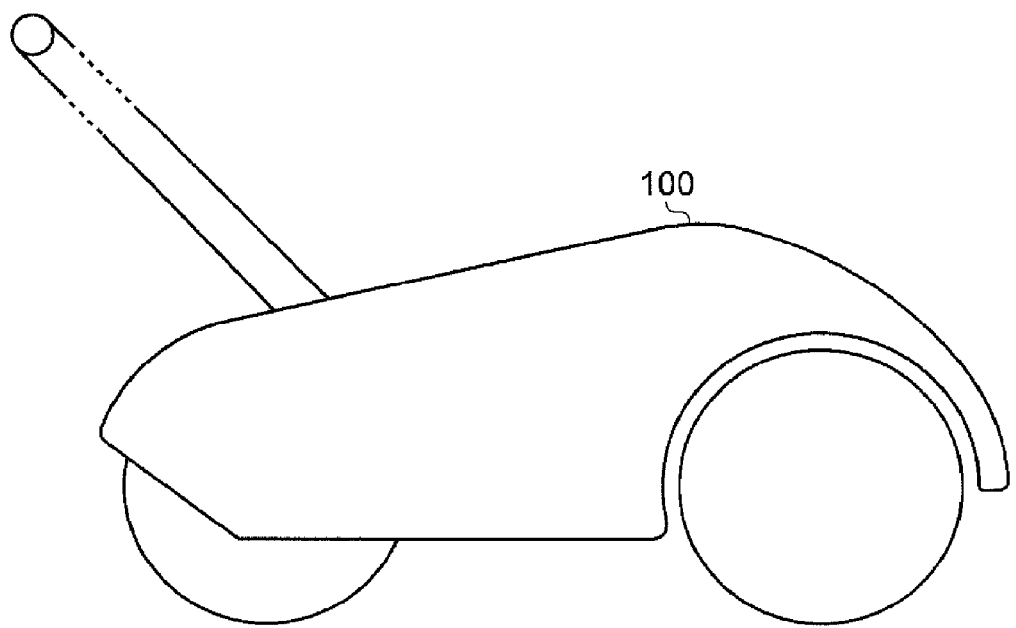
FIG. 6 schematically illustrates a platform carrying an embodiment of the present invention.

The laser light source, CCD array and data processor are all relatively small and compact components. The data processor may, for example, be in the form of a PDA or a lap top. Thus these components are easily mounted within a platform which, as shown in FIG. 6, can be in the form of a push-along cart 100. The platform carrying the laser and photo-detector may be held above the road surface by a plurality of wheels, for example three arranged in a generally triangular configuration of which two wheels are shown in FIG. 6. Surface texture data can easily be stored onto flash memory for removal for subsequent processing. Flash memory sizes of over 1 gigabyte are routinely available and hence data collection and storage is not a limiting factor.

Systems for producing a fan of light are commercially available. Alternatively a laser scanning system can be used.

The invention claimed is:

1. An apparatus for measuring surface texture of a carriageway or road, comprising a platform arranged to move over the carriageway, the platform carrying a light source arranged to illuminate the carriageway, and a detector arranged to receive light returning from the carriageway, wherein the light source projects a line of light onto the surface and data representing light returning from the line of light is captured and stored, and in which the apparatus has, in use, a direction of travel and the apparatus is switchable between a first mode in which the line of light is parallel to the direction of travel, and a second mode in which the line of light is oblique, including at right angles, to the direction of travel.

2. An apparatus as claimed in claim 1, in which repeated measurements are made, and a N+1th measurement is cross correlated with an Nth measurement, such that the measurements can be spatially aligned with one another.

3. An apparatus as claimed in claim 1, in which an average gradient of the carriageway for sections of carriageway can be calculated and an indication of changes in gradient between different sections created.

4. An apparatus as claimed in claim 2, in which an estimate of road height or carriageway height deviations from a datum can be estimated by comparing a plurality of gradient estimates.

5. An apparatus as claimed in claim 1, in which the platform is in use, propelled at less than 10 miles per hour.

6. An apparatus as claimed in claim 1, in which, in use, the platform is propelled substantially at walking speed.

7. An apparatus as claimed in claim 1, in which the line of light is provided by a laser having a "fan shaped" optical output.

8. An apparatus as claimed in claim 1, in which the line of light is provided by a laser having a scanning apparatus arranged to scan a laser spot along a path.

9. An apparatus as claimed in claim 1, in which a second data capture event includes greater than 90% of the carriageway imaged by a preceding data capture event.

10. An apparatus as claimed in claim 1, further comprising a data store for storing an output of the detector.

11. An apparatus as claimed in claim 1, further comprising a data processor arranged to calculate at least one of surface roughness, gradient and periodicity of undulations in the carriageway.

12. A method of measuring surface texture of a carriageway, the method comprising illuminating a section of the carriageway with a line of light from a light source, and receiving reflected light at a photo-detector that images the line of light so as to take multiple spaced apart measurements of carriageway texture, and in which an apparatus carrying the light source and the photo-detector has, in use, a direction of travel and it is switchable between a first mode in which the line of light is substantially parallel with the direction of travel, and a second mode in which the line of light is oblique, including at right angles, to the direction of travel.

* * * * *